Oct. 22, 1940.　　　L. L. CHESMAN　　　2,218,812
BRAKE MECHANISM
Filed Oct. 17, 1938
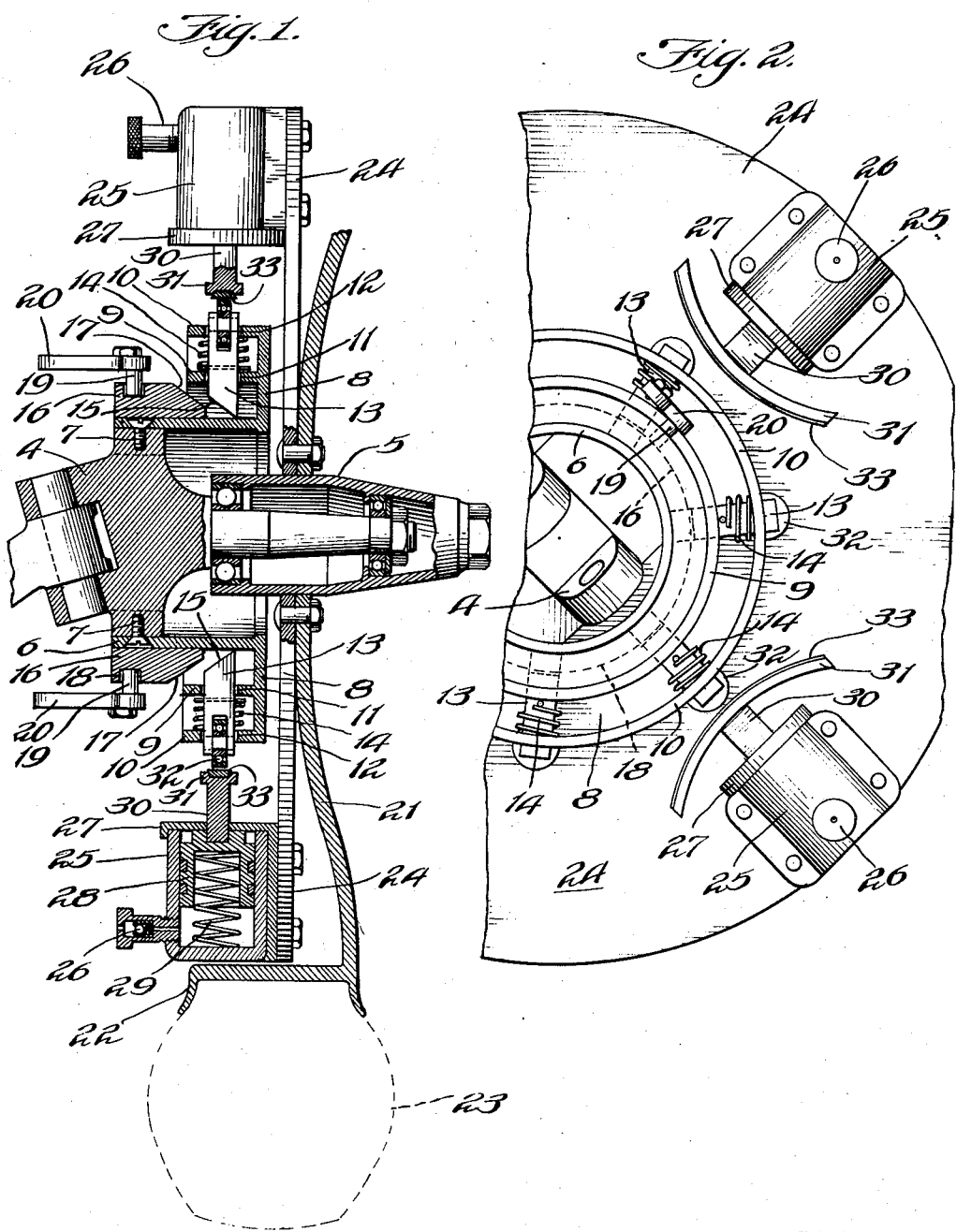
INVENTOR:
Louis L. Chesman
BY
ATTORNEY.

Patented Oct. 22, 1940

2,218,812

UNITED STATES PATENT OFFICE 2,218,812

BRAKE MECHANISM

Louis L. Chesman, Port Clinton, Ohio

Application October 17, 1938, Serial No. 235,433

10 Claims. (Cl. 188—91)

This invention relates in general to a rotary or circular brake mechanism and has more particular reference to a wheel brake for motor vehicles.

An important object of the invention is in the provision of flexible fluid pressure resistance means in retarding and stopping a rotary element such as a wheel.

A further object of the invention is in the provision of an air brake mechanism for wheels which can be gradually applied with a minimum of friction.

A still further object of the invention is in the provision of fluid pressure means which offers resistance in one direction but may have a valved relief for controlled movement in the other direction.

A still further object of the invention is in the provision of improved means for operating a vehicle brake and applying it to the wheel axles of a vehicle.

Other and further objects of the invention will appear hereinafter, the accompanying drawing illustrating a preferred embodiment of the invention in which, Figure 1 is a sectional view and Fig. 2 is a partial inside plan view of a wheel braking mechanism in accordance with the principles of this invention.

This invention comprises relatively fixed and movable parts in connection with the axle and rotating part of a wheel, the fixed parts movable outwardly to engage rotatable compression parts for opposing radial movement of the fixed parts and by their engagement to provide a rolling pneumatically opposed contact which will retard the movement of the rotating part and bring it quickly but smoothly and resiliently to a full stop, or to any reduction in speed.

Referring now more particularly to the drawing, this invention is described and illustrated as used in connection with the front wheel of an automobile having an axle 4 upon which the hub 5 of a wheel is mounted for free rotation.

A cylindrical ring 6 is secured to the axle by screws 7 or other fastening means and projects over the inner end of the hub 5 but is entirely free from contact therewith. Secured to or formed integral with the ring 6 is a circular plate or support 8 extending outwardly therefrom at the inside of the wheel. Extending in the same direction as the ring from the plate are spaced projections or rings 9 and 10 having corresponding openings 11 and 12 for brake actuators 13 which constitute contact members carried by the fixed supporting plate 8, and they are movable radially but normally held in an innermost position against ring 6 by springs 14 located between the projections 9 and 10.

At the inner end of each actuator is an inclined surface 15 and movable upon the ring 6 is a slidable collar 16 having an inclined surface or wedging surfaces 17 to engage the inclined surfaces 15 of all of the actuators simultaneously. This collar is moved on the ring by any suitable means and is shown as having a groove 18 engaged by projections 19 of an operating yoke 20 for accomplishing this result. This yoke may be suitably connected to a hand lever or to the ordinary brake pedal of a motor vehicle for operation in a well known manner.

The wheel is shown as comprising an outwardly extending disc 21 having a tire engaging rim 22 and a tire 23 at its outer periphery. Attached to the disc or some suitable position of the wheel is a plate 24 which extends beyond the outer ends of the actuators 13 and carries a plurality of cylinders 25 at the outer edge of the plate 24, the cylinders being closed at the outer end except for a check valve 26 which tends to close the cylinder against the egress of air but admits air when the piston moves inwardly, the cylinders having their open ends extending inwardly and substantially centered with respect to the actuators. The radially inner end of each cylinder is closed by a cap 27 and in the cylinder is a piston 28 pressed toward the said end of the cylinder and inwardly of the wheel by spring 29 which are of sufficient length to overcome the centrifugal force of the pistons due to high-speed or rapid wheel rotation. The cylinder closure 27 is constructed to permit free movement of air into and out of the inner cylinder end whereby interference with piston movement toward cap 27 is avoided. Extending through the cap and attached to the piston is a rod 30 for supporting a curved yoke 31 which is curved oppositely from the curvature of the inner plate or support 8 or its outer projection 10.

The outer ends of the actuators and the curved surfaces of the yokes 31 are adapted to engage when the actuators are moved outwardly and the actuators are therefore provided with roller bearings 32 in their outer ends and the yokes 31 are provided with contact parts 33 set into the curved surfaces thereof for engagement with each other.

In operation when it is desired to apply the brake, the wedging collar 16 is forced inwardly against the inclined surfaces of the actuators 13 which forces them outwardly against the pressure of the springs 14 until the roller bearings at the outer ends are in the path of the engaging yokes 31. The more they are forced outwardly the more they will engage the contact yokes and the more pressure will be exerted by the contact of the actuators in pressing the pistons outwardly in the cylinders 25 against the air pressure at the outer ends thereof, and against the pressure of the piston returning springs 29.

There are more actuators than cylinders, four cylinders and seven actuators being indicated in the accompanying drawing so that the operation of the brake will not be uneven, jerky or in stages, but will be smooth, steady and continuous, one or more actuators being in contact with the brake yokes at all times depending upon the arc of contact therewith.

When the wedging collar is withdrawn the actuators are moved inwardly by the springs 14 and the brake pistons and yokes are moved inward by the springs 29 at a rate depending upon air flow at the air inlets provided by the check valves 26.

With this construction the brake pressure can be applied lightly, gradually or to any desired degree and a smooth pneumatic brake action will be produced by the contact of the actuators with the brake yokes. By this means great pressure can be applied for retarding and stopping rotary motion of the wheel. A similar construction may be applied to the rear wheels and all operated simultaneously or in pairs together in accordance with motor vehicle brake practice.

What I claim is:

1. In a wheel brake, a fixed support concentric with and attached to the wheel axle, a plurality of pneumatic devices attached to and freely rotatable with the wheel outside of said support and having inwardly extending movable contact parts, contact members carried by the support movable outwardly to engage the contact parts of the said devices, and wedging means movable on the support for actuating and applying the members together in their outward movement.

2. In wheel brake, a plurality of pneumatic devices carried by the wheel and extending inwardly from the rim, a support surrounding the wheel axle within the devices, actuating members carried by the support and extending outwardly, and operating means on the support comprising wedging portions for moving the members outwardly into the path of said device as the wheel rotates.

3. In a wheel brake, a plurality of pneumatic devices carried by and having movable portions extending radially inward from the outer portion of the wheel, a fixed support within and from the said movable portions, actuators different in number than said devices carried by and extending outwardly from said support, and means movable axially on said support for projecting the actuators outwardly and engaging the outer ends thereof with the said movable portions of the devices as the wheels rotate.

4. A wheel brake structure in accordance with claim 3, in which the actuators are provided with inclined contact surfaces at their inner ends, and the projecting means has an inclined or wedging surface for enjoying the corresponding actuator surfaces, for moving the actuators outwardly as the projecting means is moved.

5. A wheel brake in accordance with claim 3, in which the actuators have inclined surfaces at their inner ends and having springs for pressing them inwardly, and the projecting means is in the form of a ring with a wedging surface at its edge for engaging the inclined actuator surfaces and moving them outwardly against the pressure of the springs.

6. A wheel brake in accordance with claim 3, in which the said support is circular with outer perforated projections in which the actuators are radially slidable, the inner ends of the actuators being inclined and adapted to engage said support, springs being located between the projections for pressing the actuators inwardly, and the projecting operating means having an inclined wedging edge for engaging the inclined surfaces of the actuators and moving them outwardly against their springs into the path of the movable portions of said pneumatic devices.

7. In a wheel brake, a plurality of pneumatic devices carried by a wheel and each comprising a cylinder with a piston extending radially inward, a contact yoke carried by the piston, a fixed support at the wheel axis, actuators for engaging the yokes carried by the support, means movable on the support for projecting the actuators into the path of the contact yokes.

8. In a wheel brake structure according to claim 7, the contact yoke being convexly curved at its outer end, and an anti-friction roller carried at the free end of each actuator having a diameter less than the distance of the curved ends of the yoke from the support and adapted to engage the contact surface at the end of the yoke.

9. In a wheel brake, the combination with a fixed axle support including spring pressed actuators movable radially therein and pressed inwardly by their springs, cylinders rotatable with the wheel having pistons pressed inwardly by springs therein and air check valves at the outer end, each piston carrying a contact member at the inner end of the cylinder in line with said actuators, and wedging means movable on the support for projecting the actuators against their springs and in the path of the piston contact members, against the springs and air pressure in the cylinders.

10. In a wheel brake, the combination with a plurality of cylinders mounted at the outer edge of a wheel and extending radially inward, a piston in each cylinder pressed inwardly by a spring and a check valve at the outer end of the cylinder to allow a limited air inlet so the spring can press the piston inwardly, a contact yoke carried by the piston at the inner end of the cylinder, a plurality of actuators movable axially within the path of the yokes, spring means for holding the actuators inwardly out of said path, and operating means for engaging the actuators, moving them outwardly and in the path of the yokes, compressing the piston springs and forcing the pistons outwardly in the cylinders compressing the air therein to provide a yielding cushion for the braking action.

LOUIS L. CHESMAN.